(12) United States Patent
Yao et al.

(10) Patent No.: US 11,953,612 B2
(45) Date of Patent: Apr. 9, 2024

(54) RANGING METHOD

(71) Applicant: Stichting IMEC Nederland, Eindhoven (NL)

(72) Inventors: Lichen Yao, Eindhoven (NL); Pepijn Boer, Vught (NL); Jac Romme, Schiedam (NL)

(73) Assignee: Stichting IMEC Nederland, Eindhoven (NL)

( * ) Notice: Subject to any disclaimer, the term of this patent is extended or adjusted under 35 U.S.C. 154(b) by 339 days.

(21) Appl. No.: 17/338,971

(22) Filed: Jun. 4, 2021

(65) Prior Publication Data

US 2021/0405145 A1 Dec. 30, 2021

(30) Foreign Application Priority Data

Jun. 26, 2020 (EP) .................................. 20182622

(51) Int. Cl.
*G01S 13/84* (2006.01)
*G01S 5/02* (2010.01)
*H04B 17/318* (2015.01)

(52) U.S. Cl.
CPC ........ *G01S 5/0246* (2020.05); *G01S 5/02525* (2020.05); *G01S 5/0268* (2013.01); *H04B 17/318* (2015.01)

(58) Field of Classification Search
CPC .. G01S 5/0246; G01S 5/02525; G01S 5/0268; G01S 7/4004; G01S 13/84; G01S 11/08; H04B 17/318
See application file for complete search history.

(56) References Cited

U.S. PATENT DOCUMENTS

| | | | |
|---|---|---|---|
| 6,898,197 B1 * | 5/2005 | Lavean | H04B 1/707 370/335 |
| 10,499,363 B1 * | 12/2019 | Hiscock | G01S 13/767 |

(Continued)

FOREIGN PATENT DOCUMENTS

EP 3502736 A1 6/2019

OTHER PUBLICATIONS

Extended European Search Report and Written Opinion, Application No. EP20182622.9, dated Nov. 26, 2020, 5 pages.

(Continued)

*Primary Examiner* — Kenneth T Lam
(74) *Attorney, Agent, or Firm* — McDonnell Boehnen Hulbert & Berghoff LLP

(57) ABSTRACT

A method of ranging between a first and a second radio signal transceiver comprises calculating a preliminary estimate of a value proportional to a one-way frequency domain channel response, for a frequency of a plurality of frequencies and for each of a first antenna combination and a second antenna combination of a plurality of antenna combinations; calculating a comparison value for the preliminary estimate, for the frequency and for each of the first antenna combination and the second antenna combination; determining, for the frequency and the first antenna combination, a corrected estimate of the value proportional to the one-way frequency domain channel response based on the preliminary estimate and the comparison value, for the first antenna combination and the second antenna combination; and performing a ranging calculation between the first and the second radio signal transceiver based on a plurality of such corrected estimates.

20 Claims, 4 Drawing Sheets

(56) References Cited

U.S. PATENT DOCUMENTS

| | | | |
|---|---|---|---|
| 10,694,517 B2* | 6/2020 | Black | H04W 72/0446 |
| 11,646,918 B2* | 5/2023 | Carbajal | H04L 27/0006 |
| | | | 370/252 |
| 2016/0178744 A1 | 6/2016 | Kluge et al. | |
| 2019/0187263 A1 | 6/2019 | Romme | |
| 2021/0072341 A1* | 3/2021 | Bocca | H04W 4/38 |

OTHER PUBLICATIONS

Schmidt, Ralph. "Multiple emitter location and signal parameter estimation." IEEE transactions on antennas and propagation 34, No. 3 (1986): 276-280.

Zhang, Rui, Ying-Hui Quan, Sheng-Qi Zhu, Lei Yang, Ya-chao Li, and Meng-Dao Xing. "Joint high-resolution range and DOA estimation via MUSIC method based on virtual two-dimensional spatial smoothing for OFDM radar." International Journal of Antennas and Propagation 2018 (2018).

* cited by examiner

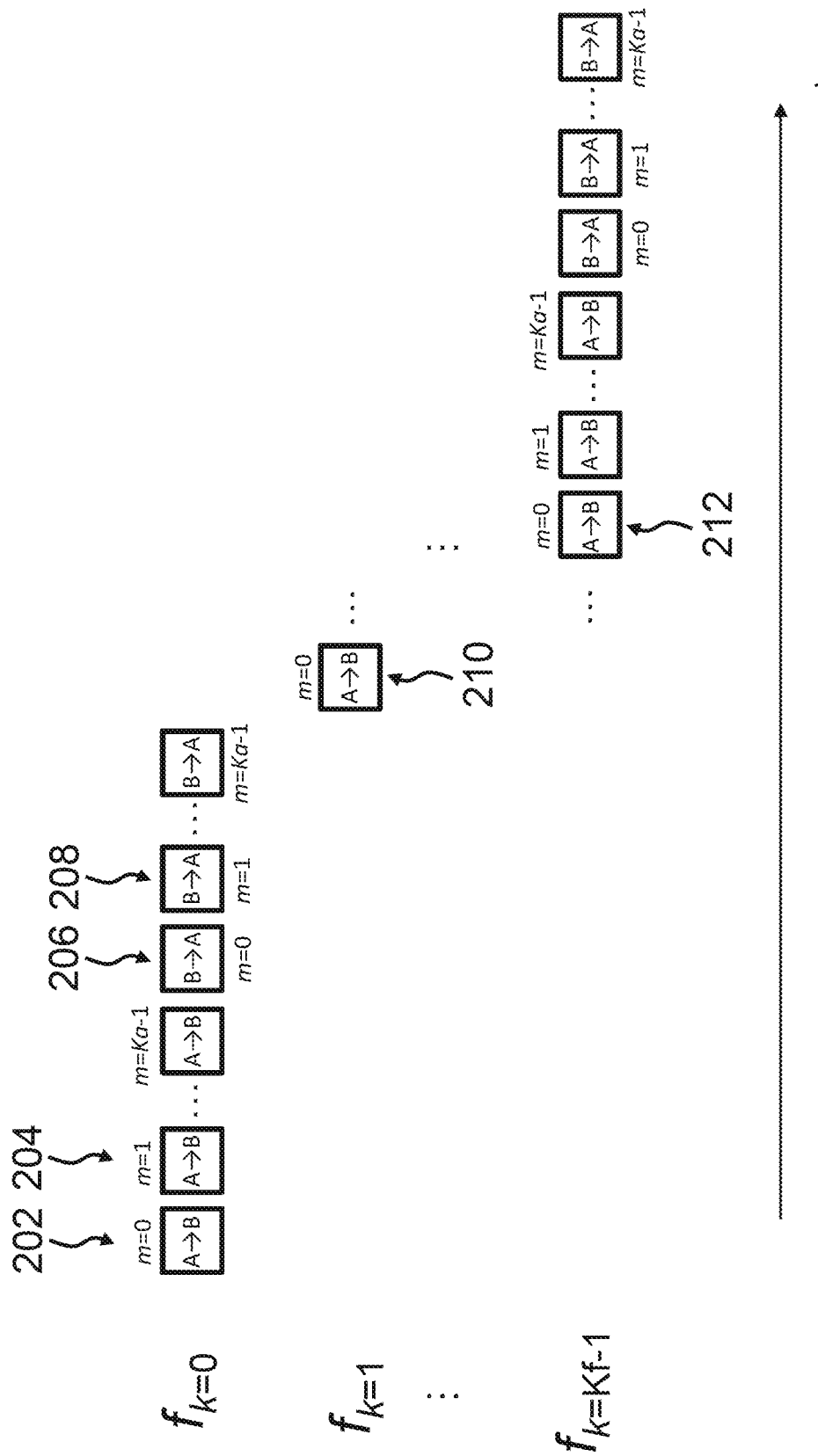

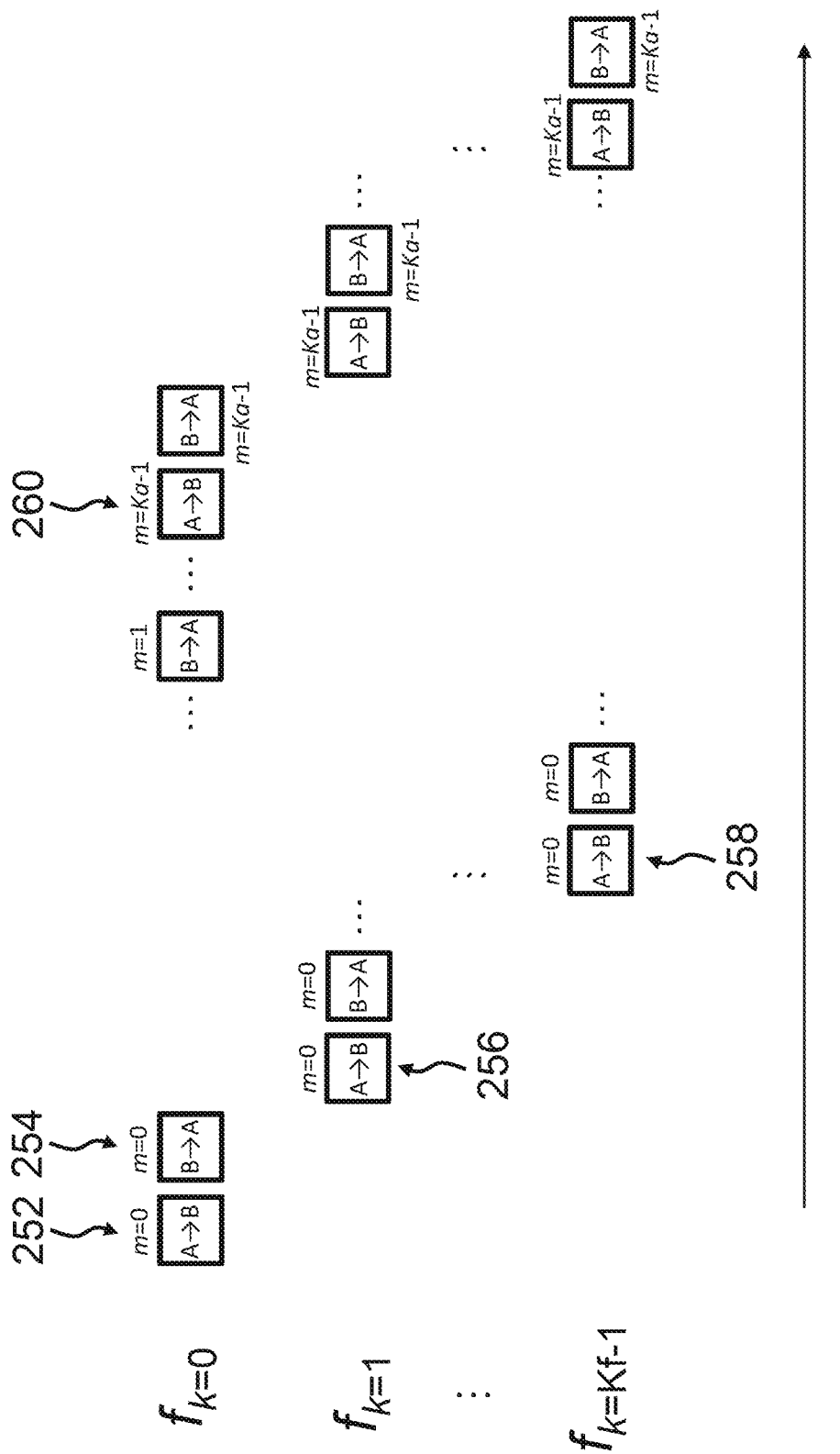

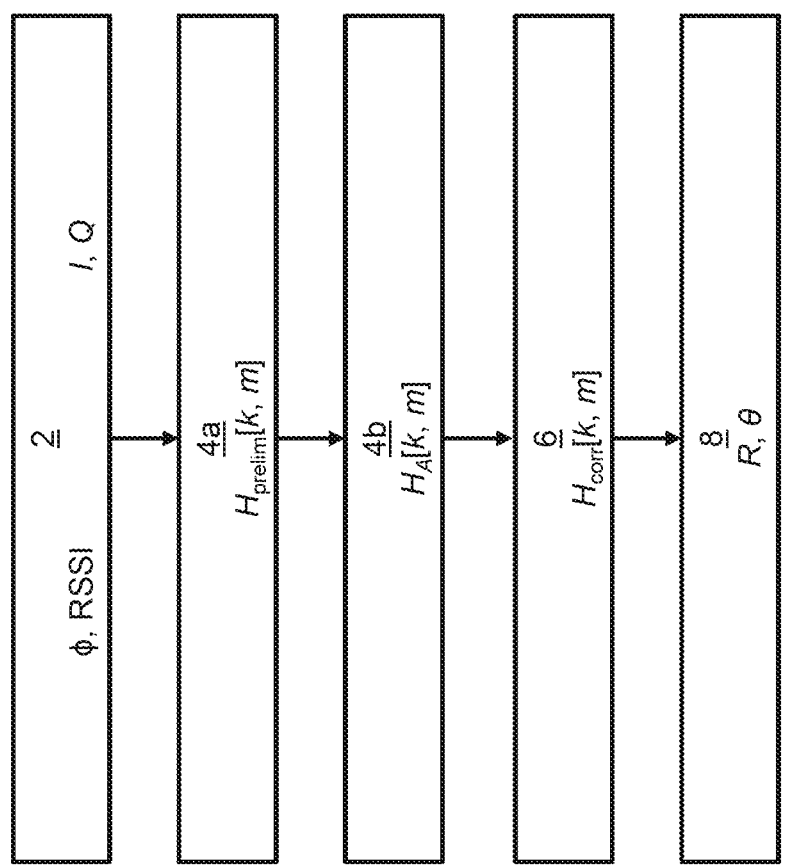

RANGING METHOD

CROSS-REFERENCE TO RELATED APPLICATIONS

The present application is a non-provisional patent application claiming priority to European Patent Application No. 20182622.9, filed Jun. 26, 2020, the contents of which are hereby incorporated by reference.

FIELD OF THE DISCLOSURE

This application relates to a method of ranging between a first and a second radio signal transceiver and to a radio signal transceiver configured for ranging to a second radio signal transceiver.

BACKGROUND

Ranging between a first radio transceiver and a second radio transceiver may, for example, involve the determination of a distance between the first radio transceiver and a second radio transceiver. Further, through the use of a plurality of antennas with a suitable spatial configuration, an angular relationship between the first radio transceiver and the second radio transceiver may be determined.

Narrowband ranging methods for determining the distance between two radio transceivers are known in the prior art.

Multicarrier phase difference (MCPD) methods, involving phase measurements at a plurality of frequencies, are described in, e.g., documents US2016/0178744A1 and EP3502736A1.

The MCPD method disclosed in document EP3502736A1 comprises a preliminary estimation of a one-way frequency domain channel response based on two-way phase measurements at a plurality of frequencies, a time synchronization offset estimation for pairs of adjacent frequencies, a final channel estimation based on the preliminary estimation and the time offset estimation, and a distance estimation based on the final channel estimation.

The two-way measurements allow phase measurement offsets between the two transceivers to cancel out. It is preferable to perform the distance determination based on the one-way frequency domain channel response, as this is less sensitive to multi-path-propagation effects. However, reconstructing the one-way frequency domain channel response from the two-way response has an inherent 180-degree phase ambiguity.

Multiple-antenna setups with suitable spatial configuration may be used in phase-based ranging, allowing, additionally, for the reconstruction of the direction of arrival (DoA). Such reconstruction in the spatial domain is also susceptible to the 180-degree phase ambiguity in the reconstruction of the one-way channel response in the spatial domain between the different antenna combinations.

SUMMARY

Therefore, an aspect of the disclosure provides an improved method of ranging between a first and a second radio signal transceiver suitable for use in multiple-antenna arrays.

To this end, there is provided a method of ranging between a first and a second radio signal transceiver, the method comprising:

receiving a first set of measurement results and a second set of measurement results, wherein:
   the first set of measurement results is acquired by the first radio signal transceiver using a first set of antennas based on signals transmitted from the second radio signal transceiver using a second set of antennas,
   the second set of measurement results is acquired by the second radio signal transceiver using the second set of antennas based on signals transmitted from the first radio signal transceiver using the first set of antennas,
   the first set of measurement results is representable as comprising, for each of a plurality of frequencies and each of a plurality of antenna combinations between the first set of antennas and the second set of antennas, a measurement pair of a phase value and a signal strength value, and
   the second set of measurement results is representable as comprising, for each of the plurality of frequencies and the plurality of antenna combinations, a phase value, or optionally, a measurement pair of a phase value and a signal strength value;
calculating a preliminary estimate of a value proportional to a one-way frequency domain channel response for a frequency of the plurality of frequencies and for each of a first antenna combination and a second antenna combination of the plurality of antenna combinations based on:
   from the first set of measurement results, the measurement results for the frequency and the respective antenna combination, and
   from the second set of measurement results, the phase value for the frequency and the respective the antenna combination, or, optionally, the measurement results for the frequency and the respective antenna combination;
calculating a comparison value for the preliminary estimate, for the frequency and for each of the first antenna combination and the second antenna combination based on, from one of the first set or the second set of measurement results, the phase value for the frequency and the respective the antenna combination, or, optionally, the measurement results for the frequency and the respective the antenna combination;
determining, for the frequency and the first antenna combination, a corrected estimate of the value proportional to the one-way frequency domain channel response based on the preliminary estimate and the comparison value, for the first antenna combination and the second antenna combination; and
performing a ranging calculation between the first and the second radio signal transceiver based on a plurality of such corrected estimates.

The term signal strength measurement should be understood to cover any measurement proportional to either the power or the amplitude of the received signal.

Receiving measurement results should be understood as either a device receiving results transmitted from a different device or making use of measurement results already locally stored on the device.

The first set of measurement results and/or the second set of measurement results being representable as comprising, for each of a plurality of frequencies, a measurement pair of a phase value and a signal strength value should be understood as including the case of the measurement results being represented as cartesian in-phase (I) and quadrature (Q) components.

The method may be performed in one of the transceivers, which may be receiving measurement results from the other transceiver in order to be able to use both the first set and the second set of measurement results in calculating the distance. However, it should also be realized that the method may be performed in any device, such as an external device, possibly having more processing power than the first and the second transceivers. The external device may then receive the first and second sets of measurement results from the respective transceivers and may perform the ranging calculation and may further communicate the result back to the transceivers.

The aspects disclosed herein stems from a realization that either the first set of measurement results or the second set of measurement results, for a plurality of antenna combinations, carries spatial information that may be used to correct the corrected estimates to remove the inherent phase ambiguity of the preliminary estimate of the one-way frequency domain channel response, in that the phase advance between different antenna combinations provides additional information, which may be used to aid reconstruction of the one-way frequency-domain channel response for each antenna combination. This allows for increased reliability in reconstructing the one-way frequency domain channel response.

Therefore, deriving a comparison value from either the first set of measurement results, taken at the first transceiver, or the second set of measurement results, taken at the second transceiver, and using the spatial phase information provided by that comparison value for correcting the one-way frequency domain channel response, allows for a more reliable estimation of the one-way channel response.

The method may be generalized for correcting the one-way frequency-domain channel response for a plurality of frequencies and for a plurality of antenna combinations.

According to one embodiment, and a first alternative, the determining of the corrected estimate comprises determining the corrected estimate based on a phase advance of the comparison value in relation to a phase advance of the preliminary estimate, between the second antenna combination and the first antenna combination, the corrected estimate representing either a phase reversal of the preliminary estimate or the preliminary estimate.

According to one embodiment, the determining of the corrected estimate comprises, for the frequency:
expressing a phase of the comparison value for the first antenna combination based on aligning a phase of the comparison value for the second antenna combination to a phase of the preliminary estimate for the second antenna combination;
calculating a first metric distance between the comparison value for the first antenna combination and the preliminary estimate for the first antenna combination;
calculating a second metric distance between the comparison value for the first antenna combination and a phase reversal of the preliminary estimate for the first antenna combination; and
determining the corrected estimate based on a comparison of the first metric distance and the second metric distance, the corrected estimate representing either the phase reversal of the preliminary estimate, or the preliminary estimate.

According to one embodiment, and a second alternative, the determining of the corrected estimate comprises:
calculating a representation of a phase advance of the preliminary estimate between the second antenna combination and the first antenna combination;
calculating a representation of a phase advance of the comparison value between the second antenna combination and the first antenna combination; and
calculating a first metric distance between the representation of the phase advance of the comparison value and the representation of the phase advance of the preliminary estimate; and
calculating a second metric distance between the representation of the phase advance of the comparison value and a phase reversal of the representation of the phase advance of the preliminary estimate,
wherein the corrected estimate of the value proportional to the one-way frequency domain channel response is determined, based on a comparison of the first metric distance and the second metric distance, the corrected estimate representing either the phase reversal of the preliminary estimate, or the preliminary estimate.

According to one embodiment, the determining of the corrected estimate is performed, for a first frequency of the plurality of frequencies, according to the first alternative, and, for one or more additional frequencies of the plurality of frequencies, according to the second alternative.

According to one embodiment:
each measurement pair of the measurement pairs is representable as a complex number, wherein the modulus of the complex number represents an amplitude corresponding to the signal strength value and the argument of the complex number represents the phase value;
the preliminary estimate and the corrected estimate each are representable by respective complex numbers, wherein the modulus of the complex number represents an amplitude response and the argument of the complex number represents a phase response; and
the comparison value is representable as a complex number formed from the measurement pair for the frequency and respective antenna combination.

In the complex number representation, phase reversal of a quantity corresponds to multiplying the quantity by −1, i.e., flipping its sign.

As is established convention in the art, a complex number representation provides a convenient notation for and convenient calculations related to periodically varying signal, wherein, again according to established convention, the actual physical real-valued signal is represented by the real part of the corresponding complex number. However, as will be readily understood by the skilled person, any other suitable representation may be used when carrying out the actual calculations. In particular, when it is stated that a calculation "may be represented" as an operation involving one or more complex numbers, it will be understood to cover any mathematically equivalent calculation no matter the actual representation used.

According to one embodiment, the calculating of the representation of the phase advance of a quantity, the quantity being the preliminary estimate or the comparison value, is representable as comprising:
calculating the complex number product of the quantity for the first antenna combination and a complex conjugate of the quantity for the second antenna combination; and, optionally,
dividing the product by the complex number norm of the quantity for the second antenna combination, the complex number norm of the quantity for the first antenna combination, or the product of the complex number norm of the quantity for the second antenna combination and the complex number norm of the quantity for the first antenna combination.

According to one embodiment, the calculating of each of the first metric distance and the second metric distance is representable as a taking of a complex number norm.

According to one embodiment, the calculating of the preliminary estimate of the value proportional to the one-way frequency domain channel response comprises:

calculating an estimate of a value proportional to a two-way frequency domain channel response based on, from the first set of measurement results, the measurements for the frequency and the respective antenna combination and, from the second set of measurement results, the phase value for the frequency and the respective the antenna combination, or optionally the measurements for the frequency and the respective the antenna combination.

According to one embodiment, the second set of measurement results comprises, for each of the plurality of frequencies and the plurality of antenna combinations, the measurement pair, and the calculating of the estimate of the value proportional to a two-way frequency domain channel response comprises, or is representable as comprising, multiplying the complex number representing the measurement pair from the first set of measurement results with the complex number representing the measurement pair from the second set of measurement results.

According to one embodiment, the calculating of the preliminary estimate of the value proportional to the one-way frequency domain channel response comprises, or is representable as comprising, taking a complex square root of the estimate proportional to the two-way frequency domain channel response.

Taking a complex square root has an inherent π (180-degree) phase ambiguity and one of the two possible solutions needs to be selected. For example, according to one embodiment, when taking the square root, a solution with the phase between $-\pi/2$ and $\pi/2$ may be selected, i.e., the solution where the real part is positive.

According to one embodiment, the performing of the ranging calculation comprises calculating a distance between the first and the second radio signal transceiver and/or calculating an angle of incidence between the first and the second radio signal transceiver.

According to one embodiment, the performing of the ranging calculation comprises determining of a distance between the first and the second radio signal transceiver using an algorithm based on IFFT and/or a super-resolution algorithm.

According to one embodiment, the method further comprises:

after the calculating of the preliminary estimate, and prior to the determining of the corrected estimate, correcting the preliminary estimate based on the measurement results for one or more frequencies different from the frequency for the preliminary estimate, but for the same antenna combination as the preliminary estimate.

According to a second aspect, there is provided a first radio signal transceiver configured for ranging to a second radio signal transceiver, the first radio signal transceiver comprising:

a measurement unit configured to acquire a first set of measurement results, using a first set of antennas, based on signals transmitted from the second radio signal transceiver using a second set of antennas, the first set of measurement results being representable as comprising, for each of a plurality of frequencies and a plurality of antenna combinations between the first set of antennas and the second set of antennas, a measurement pair of a phase value and a signal strength value, a receiver configured to receive a second set of measurement results acquired by the second radio signal transceiver using the second set of antennas based on signals transmitted from the first radio signal transceiver, the second set of measurement results being representable as comprising, for each of the plurality of frequencies and the plurality of antenna combinations, a phase value, or optionally, a measurement pair of a phase value and a signal strength value; and a processing unit configured to:

calculate a preliminary estimate of a value proportional to a one-way frequency domain channel response for a frequency of the plurality of frequencies and for each of a first antenna combination and a second antenna combination of the plurality of antenna combinations based on, from the first set of measurement results, the measurement results for the frequency and the respective the antenna combination, and, from the second set of measurement results, the phase value for the frequency and the respective the antenna combination, or, optionally, the measurement results for the frequency and the respective the antenna combination;

calculate a comparison value for the preliminary estimate for the frequency and for each of the first antenna combination and the second antenna combination based on, from the first set or the second set of measurement results, the phase value for the frequency and the respective antenna combination, or, optionally, the measurement results for the frequency and the respective the antenna combination;

determine, for the frequency and the first antenna combination, a corrected estimate of the value proportional to the one-way frequency domain channel response based on the preliminary estimate and the comparison value for the first antenna combination and the second antenna combination; and perform a ranging calculation between the first and the second radio signal transceiver based on a plurality of such corrected estimates.

Effects and features of this second aspect are largely analogous to those described above in connection with the first aspect. Embodiments mentioned in relation to the first aspects are largely compatible with the second aspect.

Further, there may be provided a computer program product comprising a computer-readable medium storing computer-readable instructions such that when executed on a processing unit, the computer program product will cause the processing unit to perform the method according to the first aspect above.

Effects and features associated herewith are largely analogous to those described above in connection with the first aspect. Embodiments mentioned in relation to the first aspect are largely compatible herewith.

BRIEF DESCRIPTION OF THE FIGURES

The above, as well as additional features, will be better understood through the following illustrative and non-limiting detailed description of example embodiments, with reference to the appended drawings. In the drawings like reference numerals will be used for like elements unless stated otherwise.

FIG. 2a is a timing diagram of transmissions between two transceivers according to a first acquisition example.

FIG. 2b is a timing diagram of transmissions between two transceivers according to a second acquisition example.

FIG. 3 is a method flowchart, in accordance with example embodiments.

Figure 1:
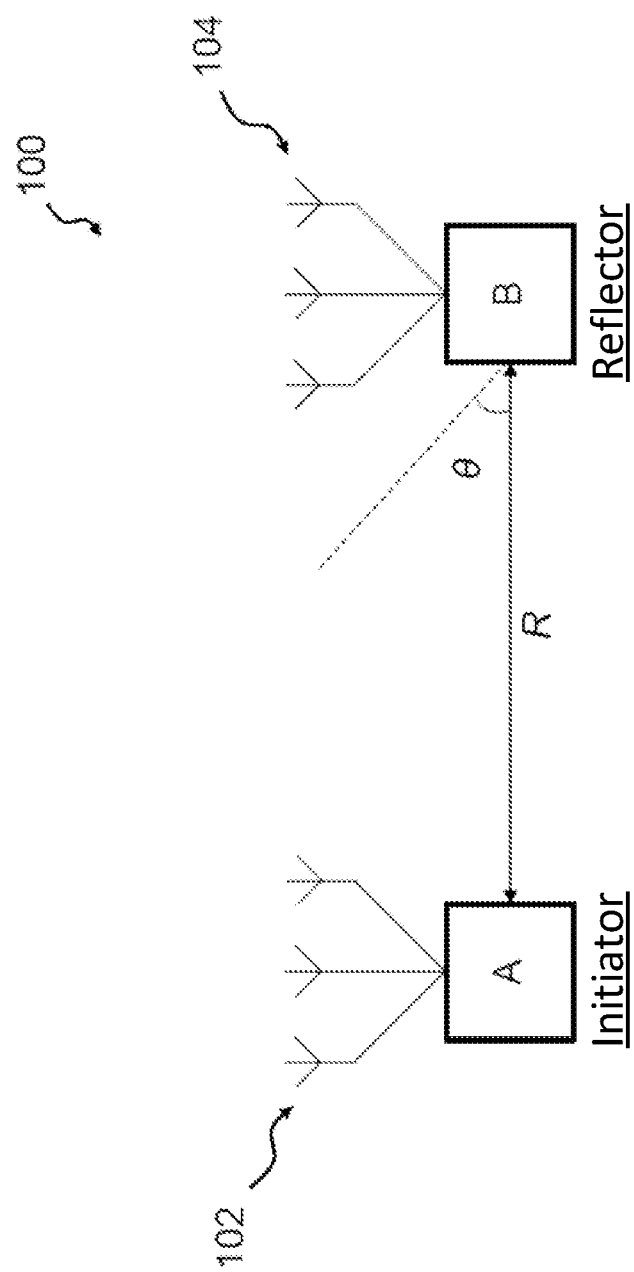
FIG. 1 is a schematic overview of two transceivers, in accordance with example embodiments.

All the figures are schematic, not necessarily to scale, and generally only show parts that are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

FIG. 1 shows a ranging arrangement 100 comprising a first device A and a second device B, which each may comprise a respective radio transceiver. The first device A is connected to a first set of antennas 102 and the second device B is connected to a second set of antennas 104.

Ranging may be performed between the first device and the second device, with the purpose of determining aspects of the spatial relationship between the first device and the second device, e.g., a distance R between the first device and the second device and/or an angle of incidence θ indicating an angle of arrival (AoA), or, more generally, a direction of arrival (DoA) at the first device A or the second device B.

Device A may be referred to as an "initiator" node and device B as a "reflector" node.

Such aspects of the spatial relationship between the first device A and the second device B may be based on measurements of radio signals transmitted by one of the first device A and the second device B and received by the other of the first device A and the second device B, and vice versa.

As is known per se, a ranging calculation may be based on reconstructing a one-way frequency-domain channel response between the first device A and the second device B based on such measurements.

Ranging may comprise the first device A transmitting a constant tone, i.e., a sinusoidal RF signal having a specific frequency and phase through one of the antennas of the first set of antennas 102 and the second device B receiving the constant tone and measuring, e.g., its phase and signal strength, or, alternatively an in-phase component I and quadrature component Q. The process may be repeated with the second device transmitting and the first device receiving.

Each of the first set of antennas 102 and the second set of antennas 104 comprises at least one respective antenna, and typically a plurality of antennas.

The antennas of the first set of antennas 102 will in the following be referred to using indices i=0, 1, 2 . . . , as illustrated in FIG. 1 with three antennas.

The antennas of the second set of antennas 104 will in the following be referred to using indices j=0, 1, 2 . . . , as illustrated in FIG. 1 with three antennas.

Signals may be transmitted by the first device A using an antenna i in the first set of antennas 102 and received by any antenna j of device B in the second set of antennas 104.

In reverse, signals may be transmitted by the second device B using the antenna j in the set of antennas 104 and received by any antenna i of device A in the first set of antennas 102.

Such a specific combination of a first antenna i from the first set of antennas 102 and a second antenna j from the second set of antennas 104 will throughout this disclosure be referred to as an antenna combination, denoted by an index m. wherein m=0, 1, 3 . . . $K_a-1$ The following paragraphs will serve to elucidate the inherent phase structure of signals received in one of the sets of antennas due to the spatial displacement within the first set of antennas 102 and the second set of antennas 104.

The antennas in each set may be spatially displaced at locations given by respective positional vectors $p_i$ for the first set of antennas 102 and $q_j$ for the second set of antennas 104.

As an example, consider the first device A transmitting a constant tone with frequency $f_c$ using one of the antennas i of the first set of antennas 102. At the second set of antennas 104 of the second device, the phase structure, i.e., the relative phase difference, or phase advance, of received signals at each of the antennas j of the second set of antennas 104 of is a function of carrier frequency and antenna positions:

$$\Delta\phi=2\pi f_c a_r \cdot (q_{j,1}-q_{j,2}),$$

where $q_{j,1}$ and $q_{j,2}$ are positional vectors, respectively, of an antenna denoted by index j=j,1 of the second set of antennas 104 and an antenna denoted by index j=j,2 of the second set of antennas 104, $a_r$ is a vector denoting the direction of arrival of the signal from the transmitting antenna of the first set of antennas and $f_c$ is the frequency of the constant tone. The phase structure is thus predictably determined by the physical displacement of the antennas.

Measurements may thus be performed for a plurality of frequencies and for a plurality of antenna combinations, as will be detailed in the following.

Acquiring of measurement results may start with the two devices A and B agreeing on the ranging parameters, aligning their frequencies (e.g., using carrier frequency offset (CFO) estimation and calibration), and realizing coarse time synchronization, i.e., both A and B start a (digital) counter, i.e., clock at, e.g., the transmission/reception of a start frame delimiter (SFD), which both devices A and B use to control a local state machine. The state machine controls when which transceiver is doing what.

In a first acquisition example, as illustrated in FIG. 2a, measurements may be performed with frequency switching in an outer loop and antenna switching in one or more inner loops. The measurements may be performed in the following steps:

1. Device A and Device B setting their respective local oscillators (LOs) to a predetermined frequency and setting a loop counter k=0.
2. At block 202, device A switching to transmit on a first antenna of the first set of antennas 102 (cf. FIG. 1) and device B switching to receive on a second antenna of the second set of antennas 104 (cf. FIG. 1) corresponding to a first antenna combination, and setting the loop counter m=0.
3. Still at block 202, device A transmitting its LO signal and device B performing a phase measurement ($\phi_B[k, m]$) relative to the LO of device B. Further, device B may perform a received signal strength indication measurement $RSSI_B[k, m]$ (not shown). Alternatively, device B may perform a measurement of the cartesian $I_B[k, m]$ (in-phase) and $Q_B[k, m]$ (quadrature) components of the signal received at B, relative to the LO of device B.

4. At block 204, device A and Device B switching to a different antenna combination m=1 and going back to step 3. This first inner loop is repeated a predetermined number of times ($K_a$), resulting in measurements at device B for $K_a$ different antenna combinations according to their respective index m.

5. At block 206, device A and B changing transmit direction, which may involve allowing a guard time for stabilizing the respective LOs.

6. Still at block 206, device A switching to transmit on a first antenna of the first set of antennas and device B switching to receive on a second antenna of the second set of antennas corresponding to the first antenna combination and resetting the loop counter m=0.

7. Still at block 206, device B transmitting its LO signal and Device A performing a phase measurement ($\phi_A[k, m]$) relative to the LO of device A. Further, device A may perform a received signal strength indication measurement $RSSI_A[k, m]$ (not shown). Alternatively, device A may perform a measurement of the cartesian $I_A[k, m]$ (in-phase) and $Q_A[k, m]$ (quadrature) components of the signal received at A, relative to its own LO.

8. At block 208, device A and Device B switching to a different antenna combination m=1 and going back to step 7. This second inner loop is repeated the predetermined number of times $K_a$, resulting in measurements at device A for $K_a$ different antenna combinations according to their respective index m.

9. At block 210, device A and Device B increasing the frequency of their respective LOs by a predetermined frequency spacing $\Delta_f$ and go back to step 2. This second outer loop is repeated a predetermined number of times ($K_f$), until at 212, resulting in measurements at $K_f$ different frequencies with a spacing $\Delta_f$ and ordered in frequency according to their respective frequency index k. For example, measurements may be performed with a 1 MHz frequency spacing of an 80 MHz band at 2.4 GHz.

When switching antennas, in the first inner loop of steps 3-4 above and the second inner loop of steps 7-8 above, the respective LOs of the first device A and the second device B may be kept running, so that their respective phases stay coherent before and after each switching to a different antenna combination. If so, phase measurements will be coherent between each different antenna combination as well.

Optionally, the respective LOs of the first device A and the second device B, may also be kept running when switching to each additional frequency k.

In a second acquisition example, as illustrated in FIG. 2b, measurements may be performed with antenna switching in an outer loop and frequency switching in an inner loop.

The measurements may be performed in the following steps:

1. At block 252, device A switching to transmit on a first antenna of the first set of antennas and device B switching to receive on a second antenna of the second set of antennas corresponding to a first antenna combination, and setting the loop counter m=0.

2. Still at block 252, device A and Device B setting their respective local oscillators (LOs) to a predetermined frequency and setting a loop counter k=0.

3. Still at block 252, device A transmitting its LO signal and device B performing a phase measurement ($\phi_B[k, m]$) relative to the LO of device B. Further, device B may perform a received signal strength indication measurement $RSSI_B[k, m]$ (not shown). Alternatively, device B may perform a measurement of the cartesian $I_B[k, m]$ (in-phase) and $Q_B[k, m]$ (quadrature) components of the signal received at B, relative to the LO of device B.

4. At block 254, devices A and B changing transmit direction, which may involve allowing a guard time for stabilizing the LO.

5. Still at block 254, device B transmitting its LO signal and Device A performing a phase measurement ($\phi_A[k, m]$) relative to the LO of device A. Further, device A may perform a received signal strength indication measurement $RSSI_A[k, m]$ (not shown). Alternatively, device A may perform a measurement of the cartesian $I_A[k, m]$ (in-phase) and $Q_A[k, m]$ (quadrature) components of the signal received at A, relative to its own LO.

6. At block 256, device A and Device B increasing the frequency of their respective LOs by a predetermined frequency spacing $\Delta_f$, corresponding to a frequency index k=1, and going back to step 3. This inner loop is repeated a predetermined number of times ($K_f$), until 258, resulting in measurements at $K_f$ different frequencies with a spacing $\Delta_f$ and ordered in frequency according to their respective frequency index k. For example, measurements may be performed with a 1 MHz frequency spacing of an 80 MHz band at 2.4 GHz.

7. Device A and Device B switching to a different antenna combination m and going back to step 2. This outer loop is repeated a predetermined number of times ($K_a$), until 260, resulting in measurements at device A and device B for $K_a$ different antenna combinations according to their respective index m.

Device A and device B may have respective phase-locked loops (PLLs) to generate their respective LO signals.

Throughout the outer loop of steps 2-7, when switching antennas, and when switching frequency in the inner loop of steps 3-6, and when switching transmit direction in step 4, the respective LOs of the first device A and the second device B may be kept running, and further, frequency stepping at each of the first device A and the second device B may be timed, so that phase measurements will be coherent between each different antenna combination.

In both the first acquisition example and the second acquisition example above, the measurements at $K_f$ different frequencies with a spacing $\Delta_f$ may, as disclosed above, be performed ordered by frequency, or, alternatively, out-of-order. If the measurements are carried out out-of-order, they may be sorted by frequency in a post-processing step.

In both the first acquisition example and the second acquisition example, the measurement results $\phi_A[k, m]$ and $RSSI_A[k, m]$, or, equivalently, $I_A[k, m]$ and $Q_A[k, m]$ form a first set of measurement results acquired by the first radio signal transceiver of device A, using the first set of antennas based on signals transmitted from the second radio signal transceiver of device B using the second set of antennas. No matter whether the actual measurements were performed as $\phi_A[k, m]$ and $RSSI_A[k, m]$ values or as $I_A[k, m]$ and $Q_A[k, m]$ values, in both cases, the first set of measurement results is representable as comprising, for each frequency k of the plurality of frequencies $K_f$ and each antenna combination m of the plurality of antenna combinations $K_a$ between the first set of antennas and the second set of antennas, a measurement pair of a phase value and a signal strength value.

Similarly, the measurement results $\phi_B[k, m]$ and $RSSI_B[k, m]$, or, equivalently, $I_B[k, m]$ and $Q_B[k, m]$ form a second set of measurement results acquired by the second radio signal transceiver of the second device B using the second set of antennas based on signals transmitted from the first radio signal transceiver of device A using the first set of antennas. No matter whether the actual measurements were performed as $\phi_B[k, m]$ and $RSSI_B[k, m]$ values or as $I_B[k, m]$ and $Q_B[k, m]$ values, in both cases, the second set of measurement results is representable as comprising, for each frequency k of the plurality of frequencies $K_f$ and each antenna combination m of the plurality of antenna combinations $K_a$ between the first set of antennas and the second set of antennas, a measurement pair of a phase value and a signal strength value.

An example method disclosed herein may, using the multicarrier phase difference (MCPD) ranging principle, for a ranging calculation between a first radio signal transceiver, device A, and a second radio signal transceiver, device B, use as input a first set of measurement results and a second set of measurement results, wherein the first set of measurement results is acquired by the first radio signal transceiver, i.e., device A, using the first set of antennas 102 based on signals transmitted from the second radio signal transceiver, i.e., device B, using the second set of antennas 104 and the second set of measurement results is acquired by the second radio signal transceiver, i.e., device B, using the second set of antennas 104 based on signals transmitted from the first radio signal transceiver, i.e., device A, using the first set of antennas 102.

FIG. 3 summarizes the steps of the example method.

In block 2 of FIG. 3, once the measurements, as described above in the first acquisition example and the second acquisition example, have been carried out, the method for ranging is not very time-critical. Therefore, it may be computed on a third device/entity with more processing power, which is, e.g., in the cloud, assuming the entity has access to the measurement data from both transceivers. Thus, the method example may either be performed on device A and/or B, but may also be collected on a third Device C, which can then calculate the distance between A and B, where device C may be in the cloud. If a device is not to carry out the method, it may transmit, or cause to be transmitted, its measurement results to the device that is to carry out the method. Thus, for example, if the method is to be carried out on device C, device B may transmit a frame with all its phase measurements to Device C, and device A may transmit a frame with all its phase measurements to Device C. Thus, the device carrying out the method receives the first set of measurement results and the second set of measurement results.

Alternatively, device A will carry out the method and may then comprise a measurement unit configured to acquire the first set of measurement results based on signals transmitted from the second radio signal transceiver, i.e., device B, as per the above. Device A may further comprise a receiver configured to receive the second set of measurement results acquired by the second radio signal transceiver, i.e., device B, based on signals transmitted from the first radio signal transceiver, i.e., device A. Further, device A may comprise a processing unit for carrying out the steps of the method, as will be described below.

For each frequency k, antenna combination m and set of measurement results, a complex number may be formed, proportional to the one-way frequency domain response, where the modulus represents an amplitude corresponding to the signal strength measurement and the argument of the complex number represents the phase measurement:

$$H_A[k,m] = A_A[k,m]\exp(j\phi_A[k,m])$$

$$H_B[k,m] = A_B[k,m]\exp(j\phi_B[k,m])$$

where $A_A[k, m]$ and $A_B[k, m]$ are values proportional to signal amplitude, obtainable, for example, by taking the square root of the corresponding RSSI values.

Alternatively, in the case of measurement of the I and Q components of the signal, $H_A[k, m]$ and $H_B[k, m]$ may be formed thus:

$$H_A[k,m] = I_A[k,m] jQ_A[k,m]$$

$$H_B[k,m] = I_B[k,m] jQ_B[k,m]$$

Disregarding measurement errors, such as thermal or phase-noise, these measured $H_A[k, m]$ and $H_B[k, m]$ are related to the actual channel responses $H[k, m]$ as follows $$H_A[k,m] \propto H[k,m]\exp(j2\pi\theta[k,m])$$

where $\theta[k, m]$ denotes a phase offset between A and B during the measurement of the kth frequency and the symbol a denotes proportionality, i.e., $a[x] \propto b[x]$ means that $a[x] = cb[x]$ for all values of x, where c is an unknown complex-value, but the same for all x.

If phase coherence is maintained for the different measurements at each antenna combination m, $\theta[k, m]$ will only depend on the frequency index k: $\theta[k, m] = \theta[k]$.

Similarly, at B, we will measure $$H_B[k,m] \propto H[k,m]\exp(-j2\pi\theta[k,m])$$

In block 4a of FIG. 3, an estimate $X[k, m]$ of a value proportional to a two-way frequency domain channel response can be formed by multiplying the two values together, thereby canceling out the factors related to the offsets $\theta[k, m]$:

$$X[k,m] = H_A[k,m]H_B[k,m] \propto (H[k,m])^2.$$

Thus, the calculation of the estimate of a value proportional to the two-way frequency domain channel response is based on the measurement pair from the first set of measurement results and the measurement pair from the second set of measurement results. Moreover, it comprises, or may be represented as comprising, multiplying the complex number representing the measurement pair from the first set of measurement results with the complex number representing the measurement pair from the second set of measurement results.

Alternatively, $X[k]$ may, regarding amplitude, be calculated based on the measurement at A only:

$$X[k,m] = |H_A[k,m]|^2 \exp(\phi_A[k,m] + \phi_B[k,m]) \propto [k,m])^2$$

where $|\ |^2$ denotes the absolute squared-operator. Note that $|H_A[k, m]|^2$ is equal to $RSSI_A[k, m]$.

A preliminary estimate of the one-way frequency domain channel response $H[k, m]$ may be calculated by taking the square root of the estimate proportional to the two-way frequency domain channel response $X[k,m]$ $$H_{prelim}[k,m]H_{sqrt}[k,m] = \sqrt{X[k,m]} \propto c[k,m]H[k,m]$$

which is related to the true one-way frequency-domain channel response according to the proportionality above, where $c[k, m]$ is either +1 or −1, caused by the inherent phase ambiguity of taking a complex square root.

For the preliminary estimate, for example, a solution with the phase between $-\pi/2$ and $\pi/2$ may be selected, i.e., with a positive real part.

Here, after calculating the preliminary estimate as per the above, and prior to determining one or more corrected estimates as per the below, the preliminary estimate may be corrected based on the measurement results for one or more frequencies different from the frequency for the preliminary estimate, but for the same antenna combination as for the preliminary estimate, for example, as disclosed in document EP3502736A1. In that document, channel reconstruction techniques are proposed to resolve the sign ambiguity in the frequency domain channel response estimation, i.e., in the k dimension. If the recovery is error-free, the only sign ambiguity that is left is on the spatial domain.

$$H_{prelim,FD}[k,m]=c[m]H[k,m]$$

The present disclosure offers methods for resolving the phase ambiguity in the m dimension. To estimate the values of $c[k, m]$, the inherent phase structure for $H_A[k, m]$ or $H_B[k, m]$ for a given frequency index k and varying antenna combinations m is used, as will be exemplified below.

Hereby, $H_A[k, m]$ or $H_B[k, m]$ functions as a comparison value for the preliminary estimate $H_{prelim,FD}[k, m]$ for different antenna combinations m, wherein the comparison value, as per the above, is representable as a complex number formed from the measurement pair for the respective frequency and antenna combination.

Thus, starting from the estimated frequency-domain channel response $H_{prelim}[k, m]$ that contains phase reversals, i.e., sign flips at various frequency indices k, and which may have been corrected along the frequency dimension according to methods known per se, we want to detect those sign-flips (or, equivalently, the signs in c) and corrects them to restore the phase structure along the spatial dimension m.

With phase coherence maintained between the measurements between each antenna combination m, for a given frequency index k, as per the first acquisition example or the second acquisition example above, $H_A[k, m]$ (or $H_B[k, m]$) carries phase structure information that may be used to correct the preliminary estimate $H_{prelim}[k,m]$.

Below, calculations will be described using $H_A[k, m]$ as the comparison value. However, equivalently, $H_B[k, m]$ could be used.

For a given frequency index k, a corrected estimate $H_{corr}$ of the one-way frequency domain channel response may be calculated for a first antenna combination $m_1$, based on the preliminary estimate for the first antenna combination $H_{prelim}[k, m_1]$, the preliminary estimate for the second antenna combination $H_{prelim}[k, m_2]$, the comparison value for the first antenna combination $H_A[k, m_1]$, and the comparison value $H_A[k, m_2]$ for the second antenna combination.

In particular, the corrected estimate may be determined based on the phase advance between the comparison value for the second antenna combination $H_A[k, m_2]$ and the comparison value for the first antenna combination $H_A[k, m_1]$ in relation to the phase advance between the preliminary estimate for the second antenna combination $H_{prelim}[k, m_2]$ and the preliminary estimate for the first antenna combination $H_{prelim}[k, m_1]$. In this way, the phase structure in m of the comparison values $H_A[k, m]$ may be exploited for correcting the preliminary estimates $H_{prelim}[k,m]$.

In a simple case, according to a first example, at block 6, the phase advance $\Delta\varphi_{prelim}$ between the preliminary estimate for the second antenna combination $H_{prelim}[k, m_2]$ and the preliminary estimate for the first antenna combination $H_{prelim}[k, m_1]$ may be calculated.

Further, the phase advance $\Delta\varphi_{comp}$ between the comparison value for the second antenna combination $H_A[k, m_2]$ and the comparison value for the first antenna combination $H_A[k, m_1]$ may be calculated.

If $\Delta\varphi_{prelim}$ is equal to $\Delta\varphi_{comp}$ within some pre-defined tolerance, the corrected estimate for antenna combination $m_1$ may be determined to be equal to the preliminary estimate $$H_{corr}[k,m_1]_{prelim}[k,m_1].$$

Otherwise, typically if $\Delta\varphi_{prelim}$ differs from $\Delta\varphi_{comp}$ by $\pi$ or $-\pi$ within some pre-defined tolerance, the corrected estimate for antenna combination $m_1$ may be determined to be equal to a phase reversal of the preliminary estimate $$H_{corr}[k,m_1]=-H_{prelim}[k,m_1].$$

According to a second example, at block 6, for a frequency index k, the phase of the comparison value for a first antenna combination $H_A[k, m_1]$ may be aligned to that of $H_{prelim}[k, 0]$, i.e., the preliminary estimate at a second antenna combination $m_2$.

$$H_A[k,m_1] \rightarrow H_A[k,m_1]e^{j\angle(-H_A[k,m_2]H_{prelim}[k,m_2])},$$

Hereby, the phase of the comparison value $H_A[k, m_1]$ for any first antenna combination $m_1=0, 1, 2 \ldots K_a$ may be expressed based on aligning the comparison value for a second antenna combination $H_A[k, m_2]$ to the phase of the preliminary estimate $H_{prelim}[k, m_2]$ for the second antenna combination. In other words, the comparison value $H_A[k, m_1]$ for the first antenna combination may be rotated in a fashion corresponding to the comparison value at the second antenna combination $H_A[k, m_2]$ having the same value as the preliminary estimate $H_{prelim}[k, m_2]$ at the second antenna combination.

For example, the second antenna combination may correspond to an initial antenna combination $m_2=m=0$.

A first metric distance $d_c$, in the form of a complex number norm, may be calculated between the comparison value $H_A[k, m_1]$ for the first antenna combination $m_1$, as rotated according to the above, and the preliminary estimate $H_{prelim}[k,m_1]$ for the first antenna combination $m_1$;

$$d_c=|H_A[k,m_1]-H_{prelim}(k,m_1)|$$

A second metric distance $d_h$ in the form of a complex number norm may be calculated between the comparison value $H_A[k, m_1]$ for the first antenna combination $m_1$, as rotated according to the above, and a phase reversal $H_{prelim}[k, m_1]$ of the preliminary estimate $H_{prelim}[k, m_1]$ for the first antenna combination $m_1$;

$$d_h = |H_A[k, m_1] - (-H_{prelim}[k, m_1])|$$
$$= |H_A[k, m_1] + H_{prelim}[k, m_1]|$$

The first metric distance $d_c$ and the second metric distance $d_h$ may be compared. If $d_c > d_h$ a corrected estimate of the value proportional to the one-way channel response is determined to be the phase reversal of the preliminary estimate $$H_{corr}[k,m_1]=-H_{prelim}[k,m_1].$$

Otherwise, the corrected estimate is determined to be the preliminary estimate $$H_{corr}[k,m_1]=H_{prelim}[k,m_1].$$

In other words, if the current distance is greater than the hypothesis distance ($d_c > d_h$), it means the sign-flipped version matches the reference spatial phase structure better. Then the sign-flip is carried out.

In a third example, at block 6, a representation of the phase advance of the preliminary estimate between the second antenna combination $m_2$ and the first antenna combination $m_1$ may be calculated as follows:

$$\Delta H_{prelim}[k, m_1] = \frac{H_{prelim}[k, m_1] H^*_{prelim}[k, m_2]}{|H_{prelim}[k, m_2]|},$$

wherein an asterisk denoted the complex conjugate and where the division by with $|H_{prelim}(k, m_2)|$ is optional. Alternatively, the divisor may be $|H_{prelim}[k, m_1]|$ or $|H_{prelim}[k, m_1]||H_{prelim}[k, m_2]|$.

Further, a representation of the phase advance of the comparison value between the second antenna combination $m_2$ and the first antenna combination $m_1$ may be calculated as $$\Delta H_A[k, m_1] = \frac{H_A[k, m_1] H^*_A[k, m_2]}{|H_A[k, m_2]|}$$

where the division by $|H_A[k, m_2]|$ is optional. Alternatively, the divisor may be $|H_A[k, m_1]|$, corresponding to dividing by $|H_{prelim}[k, m_1]|$ above, or $|H_A[k, m_1]||H_A[k, m_2]|$, corresponding to dividing by $|H_{prelim}[k, m_1]||H_{prelim}[k, m_2]|$ above.

Hereby, $\Delta H_{prelim}[k, m_1]$ and $H_A[k, m_1]$ are complex numbers, the phases of which are the phase differences of, respectively $H_{prelim}$ and $H_A$ between the second antenna combination $m_2$ and the first antenna combination $m_1$ for frequency k.

A first metric distance, in the form of a complex number norm, between the representation $\Delta H_A[k, m_1]$ of the phase advance of the comparison value and the representation $H_{prelim}[k, m_1]$ of the phase advance of the preliminary estimate may be calculated:

$$d_c = |\Delta H_A[k,m_1] - \Delta H_{prelim}[k,m_1]|.$$

A second metric distance, in the form of a complex number norm, between the representation $\Delta H_A[k, m_1]$ of the phase advance of the comparison value and a phase reversal $-\Delta H_{prelim}[k, m_1]$ of the representation of the phase advance of the preliminary estimate, the latter representing a hypothetically sign-flipped $H_{prelim}[k, m_1]$, may be calculated.

$$d_h = |\Delta H_A[k, m_1] - (-\Delta H_{prelim}[k, m_1])| =$$
$$= |\Delta H_A[k, m_1] + \Delta H_{prelim}[k, m_1]|.$$

The first metric distance $d_c$ and the second metric distance $d_h$ may be compared. If $d_c > d_h$ a corrected estimate of the value proportional to the one-way channel response is determined to be the phase reversal of the preliminary estimate $$H_{corr}[k,m_1] = -H_{prelim}[k,m_1].$$

Otherwise, the corrected estimate is determined to be the preliminary estimate $$H_{corr}[k,m_1] = H_{prelim}[k,m_1].$$

In other words, if the current distance is greater than the hypothesis distance ($d_c > d_h$), it means the sign-flipped version matches the reference spatial phase structure better. Then the sign-flip is carried out.

The first example, the second example, or the third example above, or any other approach according to an aspect disclosed herein, may be extrapolated to further frequency indices k and, for each frequency index k, to further antenna combinations m.

For example, initially, the second antenna combination may correspond to an initial antenna combination $m=m_2=0$ and the first antenna combination to a different antenna combination $m=m_1=1$.

The corrected estimate $H_{corr}[k, m_1]$ may be determined as per the first example, the second example, or the third example above.

Then, the first antenna combination may be set to $m=m_1=2, 3, \ldots K_a-1$ and the procedure repeated for each subsequent antenna combination. The second antenna combination may either be kept at $m_2=m=0$ or set to $m_2=m_1-1$.

If the corrected estimate $H_{corr}[k, m_1]$ is determined to be a phase reversal of preliminary estimate $H_{prelim}[k, m_1]$, the phase of the preliminary estimate for each subsequent antenna combination $m=m_1, m_1+1, \ldots K_a-1$ may be reversed as well.

The above may be repeated for subsequent frequency indices $k=1, 2, 3, \ldots K_f-1$.

In a specific example, correction may, first, be applied according to the second example for a first frequency index, e.g., k=0 and according to the third example for subsequent frequencies, e.g., $k=1, 2, 3 \ldots K_f-1$.

Optionally, the first example may be applied for a given frequency k, for example k=0, and when the corrected estimate is determined to be a phase reversal of the preliminary estimate for frequency k and an antenna combination m, the phase for antenna combination m for every frequency k may be reversed. Hereby, the first example may function as a preliminary reconstruction, after which the second example may be applied for every other frequency k based on estimates thus corrected.

At block 8, a ranging calculation between the first and the second radio signal transceiver may be performed based on a plurality of corrected one-way channel response estimates as per the above. The ranging calculation, using methods known per se, may comprise calculating a distance between the first and the second radio signal transceiver and/or calculating an angle of incidence between the first and the second radio signal transceiver.

The determining of the distance between the first and the second radio signal transceiver and/or the calculating of a direction of arrival (DoA) or an angle of arrival (AoA) between the first and the second radio signal transceiver may involve using an algorithm based on IFFT and/or a super-resolution algorithm. An inverse fast Fourier transform (IFFT), as is known per se, can be used but also more advanced signal processing techniques typically referred to as super-resolution algorithms, as also are known per se, as described in, e.g., Schmidt: IEEE Transactions on Antennas and Propagation, Vol AP-34, No. 3, pp. 276-280, March 1986; and Zhang, et al. "Joint High-Resolution Range and DOA Estimation via MUSIC Method Based on Virtual Two-Dimensional Spatial Smoothing for OFDM Radar." International Journal of Antennas and Propagation 2018 (2018).

The reconstructed one-way frequency-domain channel response H[k, m] allows most ranging algorithms to mitigate more interference from multipath, as the order of the problem/number of components is reduced. In the presence of multipath, the number of components interfering with the estimation of the delay of the line-of-sight (LOS) component will be reduced and ranging and localization will be more accurate.

Further, the use of spatial structure as described in this application also improves the quality of one-way frequency domain channel response, thus improving the quality of the ranging calculation between the two devices.

A computer program product comprising a computer-readable medium may store computer-readable instructions such that when executed on a processing unit, the computer program product will cause the processing unit to perform the method according to the above.

The method may be performed in a processing unit, which may be arranged in a device A, B, or C as discussed above.

The processing unit may be implemented in hardware, or as any combination of software and hardware. At least part of the functionality of the processing unit may, for instance, be implemented as software being executed on a general-purpose computer. The system may thus comprise one or more processing units, such as a central processing unit (CPU), which may execute the instructions of one or more computer programs in order to implement desired functionality.

The processing unit may alternatively be implemented as firmware arranged, e.g., in an embedded system, or as a specifically designed processing unit, such as an Application-Specific Integrated Circuit (ASIC) or a Field-Programmable Gate Array (FPGA).

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A method of ranging between a first and a second radio signal transceiver, the method comprising:
    receiving a first set of measurement results and a second set of measurement results, wherein:
        the first set of measurement results is acquired by the first radio signal transceiver using a first set of antennas based on signals transmitted from the second radio signal transceiver using a second set of antennas,
        the second set of measurement results is acquired by the second radio signal transceiver using the second set of antennas based on signals transmitted from the first radio signal transceiver using the first set of antennas,
        the first set of measurement results comprising, for each of a plurality of frequencies and each of a plurality of antenna combinations between the first set of antennas and the second set of antennas, a measurement pair of a phase value and a signal strength value, and
        the second set of measurement results comprising, for each of the plurality of frequencies and the plurality of antenna combinations, a phase value, or optionally, a measurement pair of a phase value and a signal strength value;
    calculating a preliminary estimate of a value proportional to a one-way frequency domain channel response for a frequency of the plurality of frequencies and for each of a first antenna combination and a second antenna combination of the plurality of antenna combinations based on:
        from the first set of measurement results, the measurement results for the frequency and the respective antenna combination, and,
        from the second set of measurement results, the phase value for the frequency and the respective antenna combination, or the measurement results for the frequency and the respective antenna combination;
    calculating a comparison value for the preliminary estimate for the frequency and for each of the first antenna combination and the second antenna combination based on, from one of the first set or the second set of measurement results, the phase value for the frequency and the respective antenna combination, or the measurement results for the frequency and the respective the antenna combination;
    determining, for the frequency and the first antenna combination, a corrected estimate of the value proportional to the one-way frequency domain channel response based on the preliminary estimate and the comparison value for the first antenna combination and the second antenna combination; and
    performing a ranging calculation between the first radio signal transceiver and the second radio signal transceiver based on a plurality of such corrected estimates.

2. The method of claim 1, wherein the determining of the corrected estimate comprises determining the corrected estimate based on a phase advance of the comparison value in relation to a phase advance of the preliminary estimate between the second antenna combination and the first antenna combination, the corrected estimate representing either a phase reversal of the preliminary estimate or the preliminary estimate.

3. The method of claim 2, wherein the determining of the corrected estimate for the frequency comprises:
    expressing a phase of the comparison value for the first antenna combination based on aligning a phase of the comparison value for the second antenna combination to a phase of the preliminary estimate for the second antenna combination;
    calculating a first metric distance between the comparison value for the first antenna combination and the preliminary estimate for the first antenna combination;
    calculating a second metric distance between the comparison value for the first antenna combination and a phase reversal of the preliminary estimate for the first antenna combination; and
    determining the corrected estimate based on a comparison of the first metric distance and the second metric distance, the corrected estimate representing either the phase reversal of the preliminary estimate, or the preliminary estimate.

4. The method of claim 3, wherein the calculating of each of the first metric distance and the second metric distance is representable as a taking a complex number norm.

5. The method of claim 2, wherein the determining of the corrected estimate comprises:

calculating a representation of a phase advance of the preliminary estimate between the second antenna combination and the first antenna combination;
calculating a representation of a phase advance of the comparison value between the second antenna combination and the first antenna combination;
calculating a first metric distance between the representation of the phase advance of the comparison value and the representation of the phase advance of the preliminary estimate; and
calculating a second metric distance between the representation of the phase advance of the comparison value and a phase reversal of the representation of the phase advance of the preliminary estimate,
wherein the corrected estimate of the value proportional to the one-way frequency domain channel response is determined based on a comparison of the first metric distance and the second metric distance, the corrected estimate representing either the phase reversal of the preliminary estimate, or the preliminary estimate.

6. The method of claim 2,
wherein determining of the corrected estimate for a first frequency of the plurality of frequencies comprises:
expressing a phase of the comparison value for the first antenna combination based on aligning a phase of the comparison value for the second antenna combination to a phase of the preliminary estimate for the second antenna combination;
calculating a first metric distance between the comparison value for the first antenna combination and the preliminary estimate for the first antenna combination;
calculating a second metric distance between the comparison value for the first antenna combination and a phase reversal of the preliminary estimate for the first antenna combination; and
determining the corrected estimate based on a comparison of the first metric distance and the second metric distance, the corrected estimate representing either the phase reversal of the preliminary estimate, or the preliminary estimate; and
wherein determining of the corrected estimate for one or more additional frequencies of the plurality of frequencies comprises:
calculating a representation of a phase advance of the preliminary estimate between the second antenna combination and the first antenna combination;
calculating a representation of a phase advance of the comparison value between the second antenna combination and the first antenna combination;
calculating a first metric distance between the representation of the phase advance of the comparison value and the representation of the phase advance of the preliminary estimate; and
calculating a second metric distance between the representation of the phase advance of the comparison value and a phase reversal of the representation of the phase advance of the preliminary estimate,
wherein the corrected estimate of the value proportional to the one-way frequency domain channel response is determined based on a comparison of the first metric distance and the second metric distance, the corrected estimate representing either the phase reversal of the preliminary estimate, or the preliminary estimate.

7. The method of claim 1, wherein the determining of the corrected estimate for the frequency comprises:
expressing a phase of the comparison value for the first antenna combination based on aligning a phase of the comparison value for the second antenna combination to a phase of the preliminary estimate for the second antenna combination;
calculating a first metric distance between the comparison value for the first antenna combination and the preliminary estimate for the first antenna combination;
calculating a second metric distance between the comparison value for the first antenna combination and a phase reversal of the preliminary estimate for the first antenna combination; and
determining the corrected estimate based on a comparison of the first metric distance and the second metric distance, the corrected estimate representing either the phase reversal of the preliminary estimate, or the preliminary estimate.

8. The method of claim 1, wherein the determining of the corrected estimate comprises:
calculating a representation of a phase advance of the preliminary estimate between the second antenna combination and the first antenna combination;
calculating a representation of a phase advance of the comparison value between the second antenna combination and the first antenna combination;
calculating a first metric distance between the representation of the phase advance of the comparison value and the representation of the phase advance of the preliminary estimate; and
calculating a second metric distance between the representation of the phase advance of the comparison value and a phase reversal of the representation of the phase advance of the preliminary estimate,
wherein the corrected estimate of the value proportional to the one-way frequency domain channel response is determined based on a comparison of the first metric distance and the second metric distance, the corrected estimate representing either the phase reversal of the preliminary estimate, or the preliminary estimate.

9. The method of claim 1,
wherein determining of the corrected estimate for a first frequency of the plurality of frequencies comprises:
expressing a phase of the comparison value for the first antenna combination based on aligning a phase of the comparison value for the second antenna combination to a phase of the preliminary estimate for the second antenna combination;
calculating a first metric distance between the comparison value for the first antenna combination and the preliminary estimate for the first antenna combination;
calculating a second metric distance between the comparison value for the first antenna combination and a phase reversal of the preliminary estimate for the first antenna combination; and
determining the corrected estimate based on a comparison of the first metric distance and the second metric distance, the corrected estimate representing either the phase reversal of the preliminary estimate, or the preliminary estimate; and
wherein determining of the corrected estimate for one or more additional frequencies of the plurality of frequencies comprises:
calculating a representation of a phase advance of the preliminary estimate between the second antenna combination and the first antenna combination;

calculating a representation of a phase advance of the comparison value between the second antenna combination and the first antenna combination;
calculating a first metric distance between the representation of the phase advance of the comparison value and the representation of the phase advance of the preliminary estimate; and
calculating a second metric distance between the representation of the phase advance of the comparison value and a phase reversal of the representation of the phase advance of the preliminary estimate,
wherein the corrected estimate of the value proportional to the one-way frequency domain channel response is determined based on a comparison of the first metric distance and the second metric distance, the corrected estimate representing either the phase reversal of the preliminary estimate, or the preliminary estimate.

10. The method according to claim 1, wherein:
each measurement pair of the measurement pairs is representable as a complex number, wherein a modulus of the complex number represents an amplitude corresponding to the signal strength value and an argument of the complex number represents the phase value;
the preliminary estimate and the corrected estimate each are representable by respective complex numbers, wherein the modulus of the complex number represents an amplitude response and the argument of the complex number represents a phase response; and
the comparison value is representable as a complex number formed from the measurement pair for the frequency and respective antenna combination.

11. The method of claim 1,
wherein the determining of the corrected estimate comprises:
calculating a representation of a phase advance of the preliminary estimate between the second antenna combination and the first antenna combination;
calculating a representation of a phase advance of the comparison value between the second antenna combination and the first antenna combination;
calculating a first metric distance between the representation of the phase advance of the comparison value and the representation of the phase advance of the preliminary estimate; and
calculating a second metric distance between the representation of the phase advance of the comparison value and a phase reversal of the representation of the phase advance of the preliminary estimate,
wherein the corrected estimate of the value proportional to the one-way frequency domain channel response is determined based on a comparison of the first metric distance and the second metric distance, the corrected estimate representing either the phase reversal of the preliminary estimate, or the preliminary estimate;
wherein determining of the corrected estimate for a first frequency of the plurality of frequencies comprises:
expressing a phase of the comparison value for the first antenna combination based on aligning a phase of the comparison value for the second antenna combination to a phase of the preliminary estimate for the second antenna combination;
calculating a first metric distance between the comparison value for the first antenna combination and the preliminary estimate for the first antenna combination;
calculating a second metric distance between the comparison value for the first antenna combination and a phase reversal of the preliminary estimate for the first antenna combination; and
determining the corrected estimate based on a comparison of the first metric distance and the second metric distance, the corrected estimate representing either the phase reversal of the preliminary estimate, or the preliminary estimate; and
wherein determining of the corrected estimate for one or more additional frequencies of the plurality of frequencies comprises:
calculating a representation of a phase advance of the preliminary estimate between the second antenna combination and the first antenna combination;
calculating a representation of a phase advance of the comparison value between the second antenna combination and the first antenna combination;
calculating a first metric distance between the representation of the phase advance of the comparison value and the representation of the phase advance of the preliminary estimate; and
calculating a second metric distance between the representation of the phase advance of the comparison value and a phase reversal of the representation of the phase advance of the preliminary estimate,
wherein the corrected estimate of the value proportional to the one-way frequency domain channel response is determined based on a comparison of the first metric distance and the second metric distance, the corrected estimate representing either the phase reversal of the preliminary estimate, or the preliminary estimate; and
wherein each measurement pair of the measurement pairs is representable as a complex number, wherein a modulus of the complex number represents an amplitude corresponding to the signal strength value and an argument of the complex number represents the phase value,
wherein the preliminary estimate and the corrected estimate each are representable by respective complex numbers, wherein the modulus of the complex number represents an amplitude response and the argument of the complex number represents a phase response,
wherein the comparison value is representable as a complex number formed from the measurement pair for the frequency and respective antenna combination, and
wherein the calculating of the representation of the phase advance of a quantity, the quantity being the preliminary estimate or the comparison value, comprises:
calculating a complex number product of the quantity for the first antenna combination and a complex conjugate of the quantity for the second antenna combination.

12. The method according to claim 11, further comprising:
dividing the complex number product by a complex number norm of the quantity for the second antenna combination, the complex number norm of the quantity for the first antenna combination, or the product of the complex number norm of the quantity for the second antenna combination and the complex number norm of the quantity for the first antenna combination.

13. The method according to claim 1, wherein the calculating of the preliminary estimate of the value proportional to the one-way frequency domain channel response comprises:

calculating an estimate of a value proportional to a two-way frequency domain channel response based on, from the first set of measurement results, the measurements for the frequency and the respective antenna combination and, from the second set of measurement results, the phase value for the frequency and the respective the antenna combination, or the measurements for the frequency and the respective the antenna combination.

14. The method according to claim 13, wherein the second set of measurement results comprises, for each of the plurality of frequencies and the plurality of antenna combinations, the measurement pair, and the calculating of the estimate of the value proportional to a two-way frequency domain channel response comprises multiplying complex number representing the measurement pair from the first set of measurement results with complex number representing the measurement pair from the second set of measurement results.

15. The method according to claim 13, wherein the calculating (4) of the preliminary estimate of the value proportional to the one-way frequency domain channel response comprises taking a complex square root of the estimate proportional to the two-way frequency domain channel response.

16. The method of claim 1, wherein the performing of the ranging calculation comprises calculating a distance between the first and the second radio signal transceiver.

17. The method of claim 1, wherein the performing of the ranging calculation comprises calculating an angle of incidence between the first and the second radio signal transceiver.

18. The method according to claim 1, wherein the performing of the ranging calculation comprises determining of a distance between the first and the second radio signal transceiver using an algorithm based on an inverse fast Fourier transform (IFFT) or a super-resolution algorithm.

19. The method according to claim 1, wherein after the calculating of the preliminary estimate, and prior to the determining of the corrected estimate, the method further comprises:
correcting, for the same antenna combination as the preliminary estimate, the preliminary estimate based on the measurement results for one or more frequencies different from the frequency for the preliminary estimate.

20. A first radio signal transceiver configured for ranging to a second radio signal transceiver, the first radio signal transceiver comprising:

a first set of antennas configured to acquire a first set of measurement results based on signals transmitted from the second radio signal transceiver using a second set of antennas, the first set of measurement results comprising, for each of a plurality of frequencies and a plurality of antenna combinations between the first set of antennas and the second set of antennas, a measurement pair of a phase value and a signal strength value, a receiver configured to receive a second set of measurement results acquired by the second radio signal transceiver using the second set of antennas based on signals transmitted from the first radio signal transceiver, the second set of measurement results comprising, for each of the plurality of frequencies and the plurality of antenna combinations, a phase value, or a measurement pair of a phase value and a signal strength value; and a processing unit configured to:
calculate a preliminary estimate of a value proportional to a one-way frequency domain channel response for a frequency of the plurality of frequencies and for each of a first antenna combination and a second antenna combination of the plurality of antenna combinations based on, from the first set of measurement results, the measurement results for the frequency and the respective the antenna combination, and, from the second set of measurement results, the phase value for the frequency and the respective the antenna combination, or the measurement results for the frequency and the respective the antenna combination;

calculate a comparison value for the preliminary estimate for the frequency and for each of the first antenna combination and the second antenna combination based on, from the first set or the second set of measurement results, the phase value for the frequency and the respective antenna combination, or the measurement results for the frequency and the respective the antenna combination;

determine, for the frequency and the first antenna combination, a corrected estimate of the value proportional to the one-way frequency domain channel response based on the preliminary estimate and the comparison value for the first antenna combination and the second antenna combination; and perform a ranging calculation between the first and the second radio signal transceiver based on a plurality of such corrected estimates.

* * * * *